(12) United States Patent
Rich et al.

(10) Patent No.: US 12,514,496 B2
(45) Date of Patent: Jan. 6, 2026

(54) TWO-DIMENSIONAL IMPAIRMENT SENSOR

(71) Applicant: BATTELLE MEMORIAL INSTITUTE, Columbus, OH (US)

(72) Inventors: Adam V. Rich, Columbus, OH (US); Aaron Frank, Columbus, OH (US); Scott Gibbons, Columbus, OH (US)

(73) Assignee: BATTELLE MEMORIAL INSTITUTE, Columbus, OH (US)

( * ) Notice: Subject to any disclaimer, the term of this patent is extended or adjusted under 35 U.S.C. 154(b) by 416 days.

(21) Appl. No.: 18/081,009

(22) Filed: Dec. 14, 2022

(65) Prior Publication Data
US 2023/0190190 A1 Jun. 22, 2023

Related U.S. Application Data

(60) Provisional application No. 63/292,671, filed on Dec. 22, 2021.

(51) Int. Cl.
*A61B 5/00* (2006.01)

(52) U.S. Cl.
CPC .......... *A61B 5/4863* (2013.01); *A61B 5/4845* (2013.01)

(58) Field of Classification Search
CPC ... A61B 5/4863; A61B 5/4845; A61B 5/1104; A61B 5/1128; A61B 5/163; A61B 5/6898; B60K 2360/56; B60K 28/06; G06V 40/15; G06V 40/193
See application file for complete search history.

(56) References Cited

U.S. PATENT DOCUMENTS

| | | | |
|---|---|---|---|
| 7,614,745 B2 | 11/2009 | Waldorf et al. |
| 8,585,609 B2 | 11/2013 | Kiderman et al. |
| 8,668,337 B2 | 3/2014 | Waldorf et al. |
| 9,101,312 B2 | 8/2015 | Waldorf et al. |
| 9,730,583 B2 | 8/2017 | Kiderman et al. |
| 10,231,614 B2 | 3/2019 | Krueger |
| 10,503,964 B1 | 12/2019 | Valgardsson et al. |
| 10,575,726 B2 | 3/2020 | Wetzel et al. |
| 11,426,107 B2 | 8/2022 | Gibbons et al. |
| 2005/0099601 A1 | 5/2005 | MacDougall et al. |
| 2008/0309616 A1 | 12/2008 | Massengill |

(Continued)

FOREIGN PATENT DOCUMENTS

WO 2016168724 A1 10/2016

OTHER PUBLICATIONS

Clay, Viviane, et al., Eye Tracking in Virtual Reality, Journal of Eye Movement Research, Apr. 2019, pp. 1-18.

*Primary Examiner* — Iriana Cruz
(74) *Attorney, Agent, or Firm* — Lippes Mathias LLP

(57) ABSTRACT

To determine impairment due to drugs or alcohol, an image capture component captures video of at least a head of a test subject. Cropped head images of the head of the test subject are extracted from sequential images of the video. For each cropped head image, a gaze angle of the test subject is determined from the cropped head image. The determined gaze angles are analyzed to determine horizontal nystagmus and/or angle of onset of nystagmus. A level of impairment of the test subject is determined from the horizontal nystagmus and/or angle of onset of nystagmus. A visual representation of the level of impairment of the test subject is generated on an associated display.

13 Claims, 8 Drawing Sheets

(56) References Cited

U.S. PATENT DOCUMENTS

| | | | |
|---|---|---|---|
| 2011/0275959 A1 | 11/2011 | Casali | |
| 2011/0317128 A1* | 12/2011 | Guilloux | G02C 7/041 |
| | | | 351/159.06 |
| 2012/0108909 A1 | 5/2012 | Slobounov et al. | |
| 2015/0257681 A1 | 9/2015 | Shuster | |
| 2016/0167672 A1 | 6/2016 | Krueger | |
| 2016/0213301 A1 | 7/2016 | Port | |
| 2016/0262608 A1 | 9/2016 | Krueger | |
| 2018/0008141 A1* | 1/2018 | Krueger | A61B 5/7257 |
| 2019/0008441 A1 | 1/2019 | Guzik | |
| 2019/0239790 A1 | 8/2019 | Gross et al. | |
| 2019/0246890 A1 | 8/2019 | Kerasidis | |
| 2019/0279393 A1* | 9/2019 | Ciuc | G06T 13/40 |
| 2019/0328305 A1 | 10/2019 | Wood et al. | |
| 2020/0121195 A1* | 4/2020 | Bresler | A61B 3/112 |
| 2020/0129063 A1 | 4/2020 | McGrath et al. | |
| 2020/0249753 A1* | 8/2020 | Stent | G06V 10/82 |
| 2020/0329961 A1 | 10/2020 | Oz et al. | |
| 2022/0083134 A1* | 3/2022 | Kassner | G06F 3/013 |

* cited by examiner

Drug Influence Evaluation — Symptomology Matrix

| | CNS Depressants | CNS Stimulants | Hallucinogens | Dissociative Anesthetics | Narcotic Analgesics | Inhalants | Cannabis |
|---|---|---|---|---|---|---|---|
| HGN | Present | None | None | Present | None | Present | None |
| Vertical Nystagmus | Present (high dose) | None | None | Present | None | Present (high dose) | None |
| Lack Of Convergence | Present | None | None | Present | None | Present | Present |
| Pupil Size | Normal (1) | Dilated | Dilated | Normal | Constricted | Normal (4) | Dilated (6) |
| Reaction To Light | Slow | Slow | Normal (3) | Normal | Little or none visible | Slow | Normal |
| Pulse Rate | Down (2) | Up | Up | Up | Down | Up | Up |
| Blood Pressure | Down | Up | Up | Up | Down | Up/Down (5) | Up |
| Body Temperature | Normal | Up | Up | Up | Down | Up/Down/Normal | Normal |
| Muscle Tone | Flaccid | Rigid | Rigid | Rigid | Flaccid | Normal/Flaccid | Normal |
| General Indicators | Disoriented, Droopy eyes, Drowsiness, Drunk-like behavior, Slow, sluggish reactions, Thick, slurred speech, Uncoordinated, Unsteady walk | Anxiety, Body tremors, Dry mouth, Euphoria, Exaggerated reflexes, Excited, Eyelid tremors, Grinding teeth, Increased alertness, Insomnia, Irritability, Redness to nasal area, Restlessness, Runny nose, Talkative | Body tremors, Dazed appearance, Difficulty with speech, Flashbacks, Hallucinations, Memory loss, Nausea, Paranoia, Perspiring, Poor perception of time and distance, Synesthesia, Uncoordinated. NOTE: With LSD, piloerection may be observed (goose bumps, hair standing on end). | Blank stare, Confusion, Chemical odor (PCP), Cyclic behavior, Difficulty with speech, Disoriented, Early HGN Onset, Hallucinations, Incomplete verbal responses, Increased pain threshold, "Moon Walking", Non-communicative, Perspiring, Possibly violent, Sensory distortions, Slow, slurred speech, Slowed responses, Warm to touch | Depressed reflexes, Droopy eyelids, Drowsiness, Dry mouth, Euphoria, Facial itching, Inability to concentrate, Nausea, "On the Nod", Puncture marks, Slow, low, raspy speech, Slow breathing, Slow deliberate movements. NOTE: Tolerant users exhibit relatively little psychomotor impairment. | Bloodshot eyes, Confusion, Disoriented, Flushed face, Intense headaches, Lack of muscle control, Non-communicative, Odor of substance, Possible nausea, Residue of substance, Slow, thick, slurred speech, Watery eyes | Altered time/distance perception, Alterations in thought formation, Body tremors, Bloodshot eyes, Disoriented, Drowsiness, Eyelid tremors, Euphoria, Impaired memory, Increased appetite, Lack of Concentration, Mood changes, Odor of Marijuana, Rebound Dilation, Relaxed Inhibitions, Sedation |
| Duration Of Effects | Ultra-short: A few minutes. Short: Up to 5 hours. Intermediate: 5-8 hours. Long: 8-14 hours | Cocaine: 5-90 minutes. Methamphetamine: Up to 12 hours | Duration varies widely from one hallucinogen to another. LSD: 10-12 hours. Psilocybin: 2-3 hours | PCP Onset 1-5 minutes. Peak Effects: 15-30 minutes. Exhibits effects up to 4-6 hours. DXM: Onset 15-30 min. Effects 3-6 hours | Heroin: 4-6 hours. Methadone: Up to 24 hours. Others: Vary | 6-8 hours for most volatile solvents. Anesthetic gases and aerosols --- very short duration | 2-3 hours --- exhibit and feel effects (impairment may last up to 24 hours, without awareness of effects.) |
| Usual Methods Of Administration | Injected (occasionally), Insufflation, Oral | Insufflation, Injected, Oral, Smoked | Insufflation, Oral, Smoked, Transdermal | Injected, Insufflation, Oral, Smoked, Transdermal | Injected, Insufflation, Oral, Smoked, Transdermal | Inhalation | Oral, Smoked, Transdermal |
| Overdose Signs | Clammy skin, Coma, Rapid, weak pulse, Shallow breathing | Agitation, Hallucinations | Intense bad "trip", Hyperthermia, Convulsions | Deep Coma, Seizures and convulsions | Cold clammy skin, Coma, Convulsions, Slow, shallow breathing | Cardiac arrhythmia, Possible psychosis, Respiration ceases, Severe nausea / vomiting, Risk of death | Excessive vomiting, Fatigue, Acute anxiety attacks, Paranoia, Possible psychosis |

FIGURE 8

TWO-DIMENSIONAL IMPAIRMENT SENSOR

This application claims the benefit of U.S. Provisional Application No. 63/292,671 filed Dec. 22, 2021 and titled "TWO-DIMENSIONAL IMPAIRMENT SENSOR", which is incorporated herein by reference in its entirety.

BACKGROUND

The present disclosure relates generally to a system and method for detecting or indicating a state of impairment of a test subject or user due to use of drugs or alcohol, and more particularly to a method, system and application or software program configured to enable use of a video sensor of a mobile device to acquire video providing for an assessment as to drug and alcohol impairment.

Impairment can be brought about by or as the result of ingesting or otherwise introducing an intoxicating substance, such as alcohol or a drug. Law enforcement officers commonly engage in the detection of a person's impairment, such as during traffic stops or other situations that may arise during the officers' line of duty.

Law enforcement officers currently have access to devices, such as a breathalyzer, which can detect or indicate impairment due to alcohol. However, there is no accepted or ubiquitous device such as the breathalyzer for marijuana and other non-alcoholic drugs. Accordingly, since law enforcement officers do not currently have access to roadside or otherwise portable impairment detectors, decisions regarding impairment typically rely on the subjective judgement of individual officers.

In addition, often a certified Drug Recognition Expert ("DRE") is expected to make a decision on a person's impairment. However, the training, certification, and re-certification, required by DREs, can be time consuming and costly. Further, the accuracy of any assessment made by the DREs relies upon the officer's ability to correctly administer the test and on their ability to identify and quantify subtle eye movements. One such test identifies an involuntary movement of the eyes, known as nystagmus, when the subject view a stimulus at left/right angles. For alcohol-induced impairment, the angle of nystagmus onset is correlated to blood alcohol content.

Thus, there is a need for an easy to use, objective, and highly repeatable test, method, and system to assist law enforcement officers in gathering drug impairment indicators. As a result, officers and other officials or test administrators will be empowered to make on-site decisions without needing a certified DRE. Moreover, training and recertification costs will be reduced, allowing time and resources to be redirected to other areas of need.

BRIEF DESCRIPTION

Disclosed herein are systems and methods for capturing, extracting, analyzing, and quantifying eye gaze angle and motion by a mobile device to assess drug or alcohol impairment.

In accordance with one embodiment, there is provided a system configured to determine impairment due to drugs or alcohol. The system includes an image capture component configured to capture a plurality of sequential images of a test subject. The system also includes a processor in communication with a memory storing instructions which are executed by the processor. The memory includes instructions to extract at least one cropped head image from the captured sequence, and to determine a gaze angle from the at least one cropped head image. The memory further stores instructions to analyze the determined gaze angle to determine at least one of horizontal nystagmus and angle of onset of nystagmus, and to generate a visual representation of impairment of the test subject on an associated display.

In accordance with another embodiment, there is provided a method of indicating impairment due to drugs or alcohol. The method includes capturing, via an image capture component of a mobile device, a plurality of sequential images of a test subject. The method also includes extracting at least one cropped head image from the captured sequence, and determining a gaze angle of the test subject in the at least one cropped head image. The method further includes analyzing the determined gaze angel to determine at least one of a horizontal nystagmus and angle of onset of nystagmus, and generating a visual representation of impairment of the test subject on an associated display. Further, at least one of the capturing, extracting, determining, analyzing, and generating is performed by a processor in communication with memory storing instructions thereon which are executed by the processor.

In another embodiment, there is provided a mobile device configured to determine impairment due to drugs or alcohol. The mobile device includes an image capture component that is configured to a plurality of sequential images of a test subject. The mobile device further includes a three-dimensional mapping component configured generate a cropped, three-dimensional image of the head of the test subject from the plurality of sequential images captured by the image capture component. The mobile device also includes a gaze angle determination component that is configured to receive the cropped, three-dimensional image of the head of the test subject and determine a gaze angle therefrom. In addition, the mobile device includes an analysis component that is configured to analyze the determined gaze angle to detect at least one of horizontal nystagmus or angle of onset of nystagmus to determine impairment. The mobile device further includes a display that is configured to generate a visual representation of the determined impairment.

These and other non-limiting characteristics of the disclosure are more particularly disclosed below.

BRIEF DESCRIPTION OF THE DRAWINGS

The following is a brief description of the drawings, which are presented for the purposes of illustrating the exemplary embodiments disclosed herein and not for the purposes of limiting the same.

FIG. 8 is a drug type-symptom matrix used in accordance with some embodiments.

DETAILED DESCRIPTION

Figure 1:
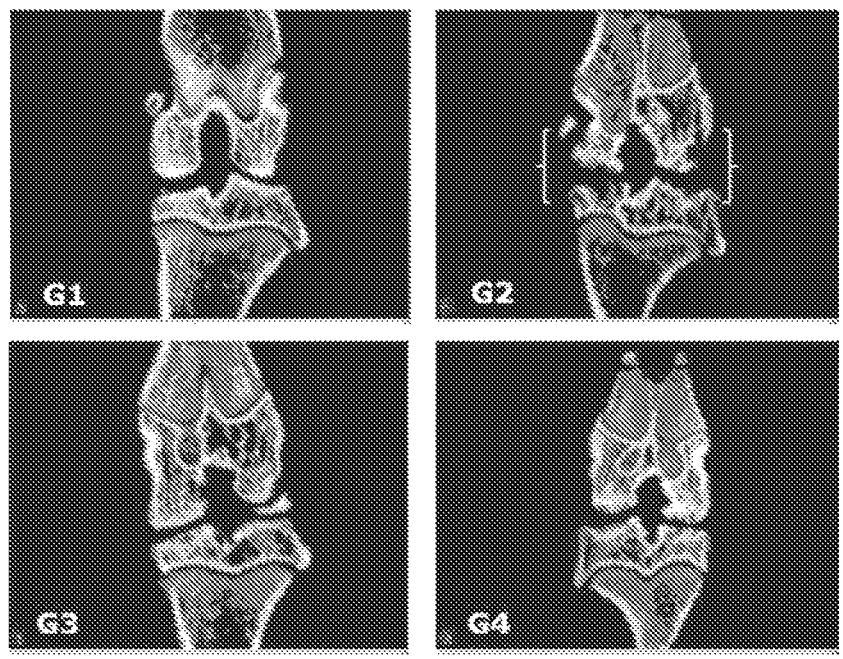
FIG. 1 is a block diagram illustrating a system for performing an impairment test which utilizes a mobile device in accordance with one embodiment of the present disclosure.

A more complete understanding of the components, processes and apparatuses disclosed herein can be obtained by reference to the accompanying drawings. These figures are merely schematic representations based on convenience and the ease of demonstrating the present disclosure, and are, therefore, not intended to indicate relative size and dimensions of the devices or components thereof and/or to define or limit the scope of the exemplary embodiments.

Although specific terms are used in the following description for the sake of clarity, these terms are intended to refer only to the particular structure of the embodiments selected for illustration in the drawings and are not intended to define or limit the scope of the disclosure. In the drawings and the following description below, it is to be understood that like numeric designations refer to components of like function.

The singular forms "a," "an," and "the" include plural referents unless the context clearly dictates otherwise.

As used in the specification and in the claims, the terms "comprise(s)," "include(s)," "having," "has," "can," "contain(s)," and variants thereof, as used herein, are intended to be open-ended transitional phrases, terms, or words that require the presence of the named components/ingredients/steps and permit the presence of other components/ingredients/steps. However, such description should be construed as also describing systems or devices or compositions or processes as "consisting of" and "consisting essentially of" the enumerated components/ingredients/steps, which allows the presence of only the named components/ingredients/steps, along with any unavoidable impurities that might result therefrom, and excludes other components/ingredients/steps.

Numerical values in the specification and claims of this application should be understood to include numerical values which are the same when reduced to the same number of significant figures and numerical values which differ from the stated value by less than the experimental error of conventional measurement technique of the type described in the present application to determine the value.

All ranges disclosed herein are inclusive of the recited endpoint and independently combinable (for example, the range of "from 2 grams to 10 grams" is inclusive of the endpoints, 2 grams and 10 grams, and all the intermediate values).

A value modified by a term or terms, such as "about" and "substantially," may not be limited to the precise value specified. The modifier "about" should also be considered as disclosing the range defined by the absolute values of the two endpoints. For example, the expression "from about 2 to about 4" also discloses the range "from 2 to 4." The term "about" may refer to plus or minus 10% of the indicated number.

The following examples are provided to illustrate the methods, processes, systems, and properties of the present disclosure. The examples are merely illustrative and are not intended to limit the disclosure to the materials, conditions, or process parameters set forth therein.

With reference to FIG. 1, a block diagram is shown illustrating a system 100 for determining impairment according to one exemplary embodiment. The system 100 generally includes a mobile device 200 (described in detail below with respect to FIG. 2) operating alone or optionally in communication with a remote server computer system 300 (described in greater detail below with respect to FIG. 3) via a suitable communications link 114. The communications link 114 between the server computer system 300 and the mobile device 200 may be accomplished via any suitable channel of data communications such as wireless communications, for example Bluetooth, WiMax, 802.11a, 802.11b, 802.11g, 802.11(x), a proprietary communications network, infrared, optical, the public switched telephone network, or any suitable wireless data transmission system, or wired communications. In one embodiment, the mobile device 200 may communicate with the server computer system 300 via a cellular data network.

As shown in the example setup of the system 100 in FIG. 1, a first reference point A 102A and a second reference point B 102B are positioned at apexes of an equilateral triangle 104 having sides 112A, 112B, and 112C, with the third apex of the triangle 104 corresponding to a position of the test subject 106. In accordance with one embodiment, the equilateral triangle 104 is utilized to fix three points, reference point A 102A, reference point B 102B, (for test subject 106 to gaze at) and the third point on which the test subject 106 is positioned. In the embodiment illustrated in FIG. 1, the difference between the gaze when looking at the left and right reference points 102A-102B is approximately 60 degrees. The skilled artisan will appreciate that while illustrated as an equilateral triangle 104, the system 100 may be implemented using other suitable layouts, e.g., a 45°-45°-90° triangle. In general, nystagmus is expected to manifest (especially in impaired subjects) as back-and-forth movement or jitter of the eyeballs when the eyes rotate beyond a certain angle, which angle is referred to herein as the angle of onset of nystagmus. The eyeball movement can be in the vertical and/or horizontal direction (i.e., vertical nystagmus or horizontal nystagmus), and/or can manifest as a torsional movement (i.e. torsional nystagmus). In embodiments herein, horizontal nystagmus is considered as the indicator of impairment, and hence the subject is instructed to keep his or her head pointed as it often occurs in response to horizontal movements of the eyeball which tend to be easier to produce by instruction to the subject, e.g. using the illustrative left and right reference points 102A-102B and instructing the subject to keep his or her head directed along a centerline 108 equidistant between the left and right reference points 102A-102B and move his or her gaze toward one or the other of the reference points 102A-102B to trigger horizontal nystagmus. However, it is alternatively contemplated to use another type of nystagmus as the indicator of impairment, e.g. using vertical nystagmus and instructing the subject to move his or her gaze up (or down) while keeping the head level.

As illustrated in FIG. 1, the mobile device 200 is suitably positioned on the centerline 108 of the triangle 104 facing the test subject 106. In accordance with the embodiment depicted in FIG. 1, the mobile device 200 is positioned on a tripod 110, suitably adjusted to align with the eyes of the test subject 106. That is, the image capture component 214, e.g., camera, IR sensor, etc., is suitably positioned at a height that enables capture of the head of the test subject 106.

It will be appreciated that the illustration in FIG. 1 is intended solely for example purposes, and the exact configuration, e.g., location of the test subject 106, the mobile device 200, and reference points 102A and 102B may vary in accordance with implementation. For example, roadside detection may utilize the reference points 102A-102B affixed to tripods or posts positioned a predetermined distance from the test subject 106. In such an embodiment, the mobile device 200 may be mounted to the tripod 110, or may be held by the administrator of the test. In other embodiments, the system 100 may be implemented without fixed reference points 102A-102B, e.g., the mobile device 200 or another reference point such as a police officer's hand may be moved while the test subject 106 is directed to follow the mobile device 200 or officer's hand to produce the desired eye movement gather sufficient data. Operations of the system 100 will be better understood in conjunction with the discussion below of the mobile device 200.

Figure 2:
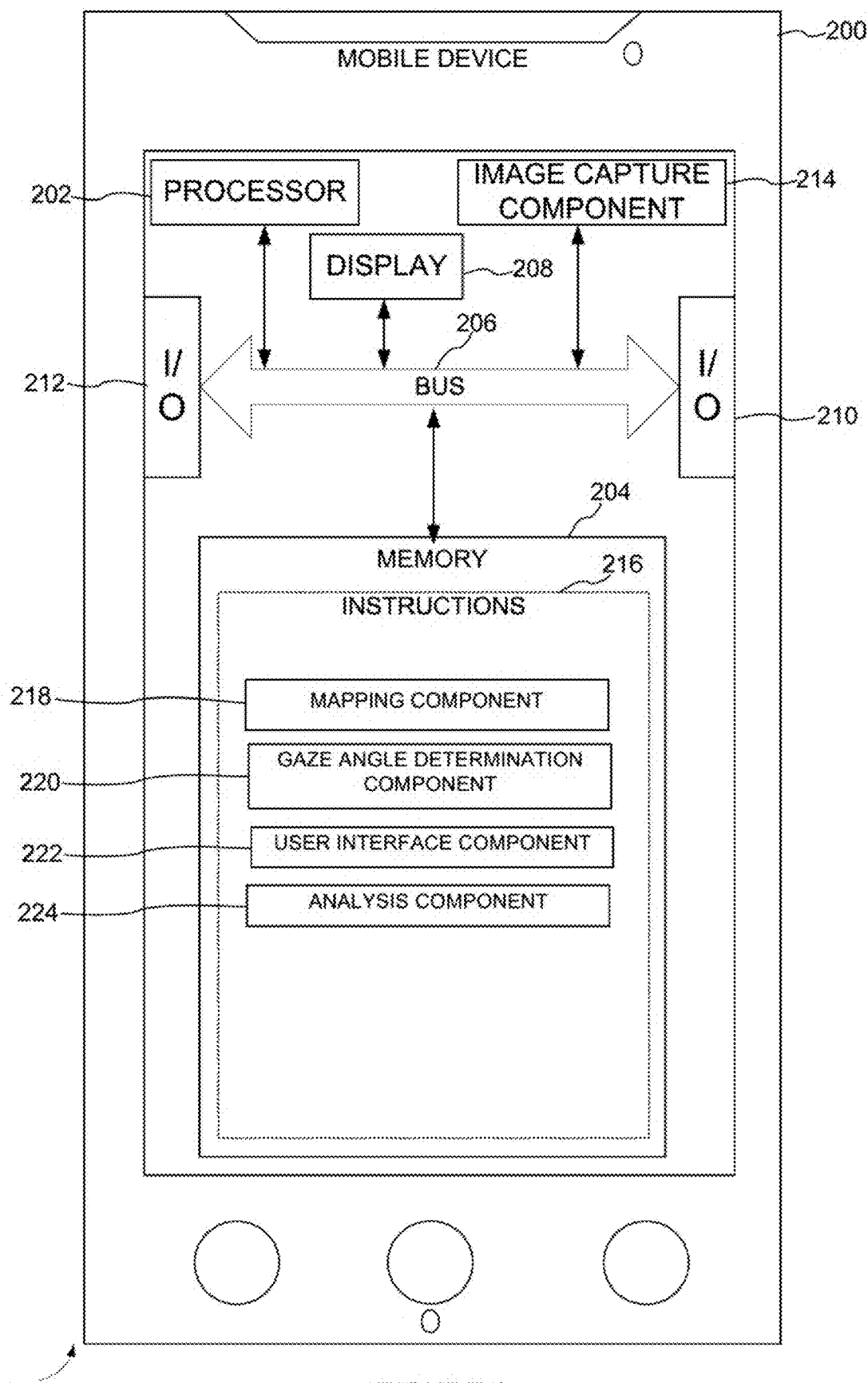
FIG. 2 is a block diagram illustrating an exemplary mobile device used in the system for performing an impairment test of FIG. 1 in accordance with one embodiment of the present disclosure.

Turning now to FIG. 2, the mobile device 200 depicted in FIG. 1 may be implemented as a smartphone (also sometimes referred to as a cellular telephone or cellphone), a tablet computer, or the like employing an operating system such as iOS, ANDROID, BLACKBERRY, WINDOWS, APPLE, CHROME, or the like. However, it is to be appreciated that the mobile device 200 is representative of any personal computing devices, such as personal computers, netbook computers, laptop computers, workstation computers, personal data assistants, web-enabled cellular telephones, tablet computers, proprietary network devices, or other web-enabled electronic devices. It will be appreciated that the illustrative mobile device 200 presented in FIG. 2 is representative of any suitable personal computing device known in the art capable of providing a user with access to the Internet and/or the ability to interact with other electronic devices. Accordingly, while depicted in FIG. 2 as a representative mobile device, any personal computing device may be utilized in accordance with the systems and methods set forth herein. In embodiments, in which the illustrative mobile device 200 is used, the image capture component 214 may optionally be a built-in camera of the mobile device 200, which built-in camera is ordinarily used for acquiring images of persons, objects, or so forth, but which is repurposed here for use in the disclosed system 100 for determining impairment. Similarly, in an embodiment in which the device is a netbook or laptop computer with a built-in bezel webcam, the image capture component 214 may optionally be that bezel webcam.

As shown in FIG. 2, the mobile device 200 may include a processor 202, which executes one or more instructions or applications 216 in the performance of an exemplary method discussed below. The mobile device 200 may further include a memory 204 storing the instructions 216 in data communication with the processor 202 via a system bus 206. The processor 202 of the mobile device 200 may be in data communication with the server computer system 102 via an I/O interface 212 or I/O interface 210. The mobile device 200 may further include a display 208 suitably configured to display data to an associated user, receive input from the associated user, and the like. In some embodiments, for example, when part of a mobile device or tablet, the display 208 of the mobile device 200 may be configured as a touch-screen display capable of receiving user instructions via user contact on the display, e.g., LCD, AMOLED, LED, RETINA, etc., types of touch-screen displays. Alternatively, when the mobile device 200 is implemented as a desktop or laptop computer or smart TV, the I/O interface 212 or 210 may be coupled to an input device (keyboard/mouse/touchpad/remote), as well as an output device, e.g. a display (monitor), speakers, and the like.

The memory 204 may represent any type of non-transitory computer readable medium such as random access memory (RAM), read only memory (ROM), magnetic disk or tape, optical disk, flash memory, or holographic memory. In one embodiment, the memory 204 comprises a combination of random access memory and read only memory. In some embodiments, the processor 202 and memory 204 may be combined in a single chip. The input/output interface(s) 210, 212 allow the mobile device 200 to communicate with other devices via a communications network, via Universal Serial Bus or Lightning® ports, via wired or wireless connections, and may comprise a modulator/demodulator (MODEM). Memory 204 may store data processed in the method as well as the instructions for performing the exemplary method. The digital processor 202 can be variously embodied, such as by a single core processor, a dual core processor (or more generally by a multiple core processor), a digital processor and cooperating math coprocessor, a digital controller, or the like.

A challenge presented by the use of the mobile device 200 for detecting nystagmus is that the mobile device 200 (and more particularly the image capture component 214 of the mobile device 200) is not at a fixed reference position with respect to the subject's head. Moreover, the image capture component 214 is a two-dimensional image sensor, which provides a two-dimensional image of the head. The back-and-forth or jittering eyeball movement that is characteristic of nystagmus is with respect to the pose of the subject's head. Said another way, the "reference position" for the jitter is pose of the head. If the head is moving at the same time this jitter is being measured, it can be difficult to disambiguate the jitter (i.e. nystagmus) from the head motion. Similarly, the angle of onset of nystagmus is usually measured with respect to the (anatomical) median plane of the head. Hence, it can be difficult to measure this angle of onset when the image capture component 214 captures two-dimensional images and is not at a fixed reference position with respect to the subject's head. As a comparison, while eye trackers built into a virtual reality (VR) headset may acquire two-dimensional images of the eyeballs, the eye trackers are at a fixed reference position with respect to the wearer's head, because the VR headset is secured to the wearer's head. Thus, the eye trackers are at a fixed reference position with respect to the wearer's head, and move together with the wearer's head. Hence, the VR headset (and the contained eye trackers) is in the same frame-of-reference as the head.

As shown in FIG. 2, to address such problems the instructions 216 include a three-dimensional (3D) mapping component 218 configured to map the three-dimensional structure of a human body (or at least the head) from an image. In some embodiments, the three-dimensional mapping component 218 is configured to generate a cropped, three-dimensional image of the head of the test subject 106 from a two-dimensional image (e.g., photo, video, etc.) captured by the image capture component 214 of the mobile device 200. In some embodiments, the three-dimensional mapping component 218 may be implemented as a deep learning algorithm, trained using various methods as will be appreciated by those skilled in the art. Suitable examples of such algorithms include, for example and without limitation, Densepose and the like. For example, the deep learning algorithm can fit a three-dimensional (3D) head pose of the head to the cropped head image, so that the cropped head image is labeled with the fitted 3D head pose indicating the three-dimensional position of the head in space (e.g., in terms of an orientation of the medial plane of the head respective to chosen 3D frame of reference coordinates).

The deep learning algorithm can be trained using training data comprising images of heads in different positions and "ground truth" fitted 3D head poses manually labeled by a graphical artist, anatomist, or the like using 3D graphical rendering software. The adjustable parameters of the deep learning algorithm (e.g., weights and/or activation function parameters of an artificial neural network in one nonlimiting illustrative example) are trained by machine learning and artificial neural network (ANN) training techniques such as back-propagation to output a 3D head pose (e.g., orientation of the medial plane of the head) for a head image that is optimally close to the "ground truth" 3D head pose for that head image.

Figure 4A:
FIG. 4 are illustrative photographs of a test subject extracted and analyzed in accordance with the systems and methods set forth herein.
Figure 4B:

The instructions 216 depicted in FIG. 2 further include a gaze angle determination component 220 configured to receive the output from the three-dimensional mapping component 218 (e.g., sequence of cropped head images from video, cropped video frames, etc.), and determine a gaze angle. In accordance with some embodiments, the gaze angle determination component 220 is configured to analyze a sequence of cropped head image(s) output by the three-dimensional mapping component 218 and determine a gaze angle of the test subject 106 in each of the cropped head images. In some embodiments, the gaze angle determination component 220 may utilize long short-term memory ("LSTM") recurrent neural networks for training and gaze angle determination. In some embodiments, the gaze angle determination component 220 may be implemented as an algorithm executed by the processor 202 of the mobile device 200. Suitable examples of such algorithms include, for example and without limitation, Gaze360 model algorithm (see, e.g. Kelinhofer et al., "Gaze360: Physically Unconstrained Gaze Estimation in the Wild", in 2019 IEEE/CVF International Conference on Computer Vision (ICCV)), or the like. FIG. 4A provides an illustrative photograph analyzed by the gaze angle determination component 220 of the test subject looking at the mobile device 200. FIG. 4B provides an illustrative photograph analyzed by the gaze angle determination component 220 of the test subject looking at a reference point 102A or 102B during the testing. As diagrammatically seen in FIGS. 4A and 4B, gaze determination entails determining the median plane of the head (represented in FIGS. 4A and 4B as the intersection plane between the differently shaded left and right head halves) and a gaze direction with respect to that median plane. More generally, the gaze angle for each cropped head image is determined with respect to the 3D head pose of the head in the cropped head image.

The instructions 216 may also include a user interface component 222 configured to display via the display 208 a graphical user interface to a user of the mobile device 200. In some embodiments, the user of the mobile device 200 may be the administrator of the impairment testing of the subject 106. In such embodiments, the user interface component 222, via the display 208, may provide instructions or prompts to the user of the mobile device 200 regarding positioning of the mobile device 200, activation of the mapping component 218, the gaze angle determination component 220, or the like. In accordance with another embodiment, the user interface component 222 may be configured to provide instructions and/or feedback to either the administrator of the testing or the test subject 106.

The instructions 216 further include an analysis component 224 that may be configured to receive information/data from the three-dimensional mapping component 218, the gaze angle determination component 220, and the like, so as to analyze the information/data received to determine a level of impairment corresponding to the test subject 106. In some embodiments, the analysis component 224 is configured to analyze the quantified data received from the gaze angle determination component 222 to detect any evidence of horizontal nystagmus and/or angle of onset of nystagmus to determine impairment. To detect nystagmus, the gaze angle in successive images of video are analyzed to detect a small-amplitude and rapid back-and-forth or jittering movement of the gaze angle with respect to the median plane of the head. If the frequency of eyeball jitter is faster than can be directly detected based on the video frame rate, in a variant embodiment a confidence level or other uncertainty metric of the gaze angle determination for each image can be used, under the expectation that in the presence of high frequency nystagmus the gaze angle determination will become more uncertain. These are merely illustrative examples. The angle of onset of nystagmus is detected as the gaze angle at which nystagmus is first detected. To facilitate detection of the angle of onset of nystagmus, during the testing the subject may be asked, for example, to look straight ahead, and then with the head held still to move his or her gaze to the reference point A 102A (or, in a second run, the reference point A 102B). As the angle of onset of nystagmus generally occurs at a relatively large gaze angle relative to the straight-ahead gaze (i.e., directed along the median plane), the expectation is that nystagmus will first be detected at some nystagmus onset angle as the subject's gaze moves to larger angle.

The level of impairment is estimated based on the detected nystagmus and/or the detected angle of onset of the nystagmus. In general, the amplitude, frequency, and/or angle of onset of nystagmus may vary depending on factors such as the type of impairing drug (e.g., marijuana, cocaine, et cetera) or combination of drugs as well as other factors such as gender, chronic medical conditions (e.g., nearsightedness or other ocular disease), and/or so forth. To estimate the level of impairment, a model is suitably developed to associate nystagmus metrics such as nystagmus amplitude, jitter frequency, and/or angle of onset of the nystagmus with level of impairment. The model development can utilize training data comprising measurements of nystagmus made using the system for training subjects labeled with "ground truth" impairment level determined by blood tests or the like. In some implementations in a law enforcement context, the determined level of impairment may be of insufficient certainty to form the basis of charging a subject with impairment by a prohibited substance, but may for example provide probable cause for detaining the subject for questioning, administering a blood test, or other further law enforcement activity. These are again merely nonlimiting illustrative examples.

According to one embodiment, the type of impairing drug may be determined by the analysis component 224 through correlation with a suitable symptom matrix. FIG. 8 provides a nonlimiting example of a drug influence evaluation-symptom matrix correlating various testing outcomes with types of impairing drugs. The skilled artisan will appreciate that variations on the matrix and components thereof are contemplated herein. In some exemplary embodiments, the analysis component 224 may be configured to determine one or more of HGN, vertical nystagmus, lack of convergence, pupil size, reaction to light, etc., from the information/data from the three-dimensional mapping component 218, the gaze angle determination component 220. Thereafter, the analysis component 224 may output a type of drug associated with the impairment, e.g., hallucinogens, depressants, stimulants, *cannabis*, etc.

In accordance with one embodiment, the analysis component 224 may be configured to interact with the user interface component 222. In such an embodiment, the analysis component 224 outputs a level of impairment to the user interface component 222, which generates a visual representation thereof on the associated display 208.

In some embodiments, the analysis component 224 may be configured to retrieve and/or receive user data on the test subject 106 undergoing the testing. User data may be input by the administrator via the user interface component 222, i.e., directly into the mobile device 200, remotely received via the communications link 114 from the server 300, or alternatively received from another source, e.g., a law enforcement, state vehicle department, federal database, or the like. In some embodiments, the received/input/retrieved user data may be input by the testing component 224 into testing parameters/questions to determine output parameter values for each impairment test performed. In varying embodiments, the various components discussed above may be incorporated into a mobile app (e.g., ANDROID, IOS, etc.) resident in memory 204. Operations of the mobile device 200 will be better understood in conjunction with the methodology discussed in FIG. 6 below.

Figure 3:
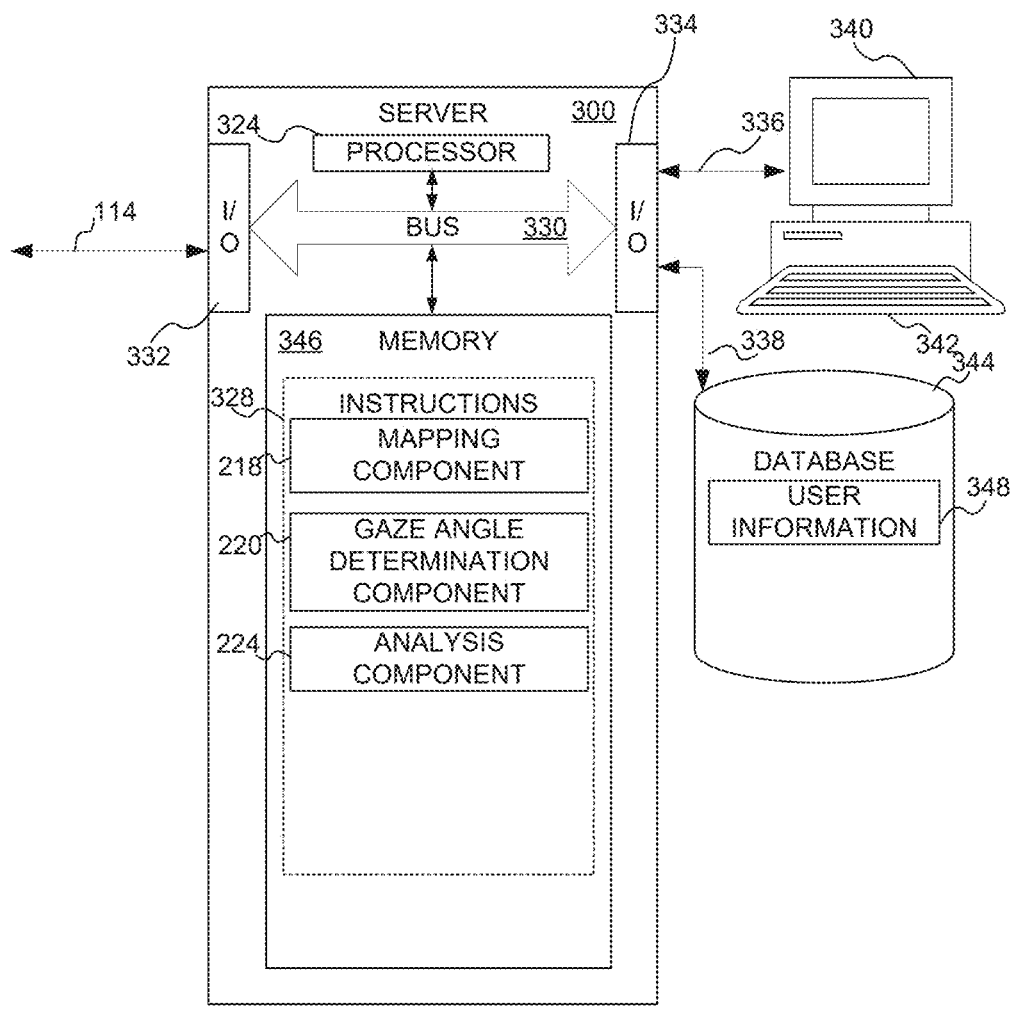
FIG. 3 is a block diagram illustrating an optional remote server in communication with the mobile device of FIG. 2 in accordance with one exemplary embodiment.

Turning now to FIG. 3, there is shown a backend server 300 utilized in some embodiments of the two-dimensional impairment detection system. It will be appreciated that the server 300 is used in optional embodiments, e.g., implementations when the mobile device 200 is incapable of utilizing the mapping component 218 and/or the gaze angle determination component 220 (for example, due to limited computing capacity of a cellphone or other mobile device 200). That is, in the event that the mobile device 200 does not include these components, the server 300 may be used in conjunction with the mobile device 200.

In the optional embodiment referenced above, the exemplary server computer system 300 includes a processor 324, which performs the exemplary method by execution of processing instructions 328 that are stored in memory 326 connected to the processor 324, as well as controlling the overall operation of the server computer system 300. It will be appreciated that the system 100 illustrates a single server computer system 300, however, the skilled artisan will appreciate that multiple such server computer systems 300 may be used herein to perform one or more of the operations discussed hereinafter. In accordance with other embodiments, a plurality of distinct server computer systems 300 are utilized, e.g., a third party cloud service, to implement the systems and methods set forth herein.

The instructions 328 illustrated in FIG. 3 may include the three-dimensional mapping component 218 configured to receive video captured by the mobile device 200 during evaluation of a test subject 106. in accordance with one embodiment, the mobile device 200, using the associated image capture component 214, may collect a video of the test subject 106 alternating viewing from the reference point A 102A to the mobile device 200 to reference point B 102B and back. The length of the captured video, as will be appreciated by those skilled in the art, may depend upon the number of times the view of the test subject 106 alternates between reference points 102A-102B during administration of the test. The video may be streamed directly to the component 218, or alternatively communicated via any suitable mechanism, e.g., Internet, cellular data, or the like. In some embodiments, the video may be compressed for transmission and decompressed for analysis, in accordance with data transmission bandwidths.

Upon receipt of the captured video, the mapping component 218 may function as set forth above with respect to the description of FIG. 2. That is, the three-dimensional mapping component 218 may be configured to map the three-dimensional structure of a human body from an image. In some embodiments, the three-dimensional mapping component 218 is configured to generate a cropped, three-dimensional image of the head of the test subject 106 from a two-dimensional image (e.g., photo, video, etc.) captured by the image capture component 214 of the mobile device 200. In some embodiments, the three-dimensional mapping component 218 may be implemented as a deep learning algorithm, trained using various methods as previously described and as will be appreciated by those skilled in the art. Suitable examples of such algorithms include, for example and without limitation, Densepose and the like.

The instructions 328 depicted in FIG. 3 may further include the gaze angle determination component 220. As with the embodiment described above, the gaze angle determination component 220 may be configured to receive the output from the three-dimensional mapping component 218 (e.g., sequence of cropped head images from video, cropped video frames, etc.), and determine a gaze angle as previously described. In accordance with some embodiments, the gaze angle determination component 220 is configured to analyze a sequence of cropped head image(s) output by the three-dimensional mapping component 218 and determine the gaze angle of the test subject 106 in each such image. In some embodiments, the gaze angle determination component 220 may utilize long short-term memory ("LSTM") recurrent neural networks for training and gaze angle determination. In some embodiments, the gaze angle determination component 220 may be implemented as an algorithm executed by the processor 202 of the mobile device 200. Suitable examples of such algorithms include, for example and without limitation, Gaze360 model algorithm, or the like.

As illustrated in FIG. 3, the instructions 328 resident in the memory 346 of the server 300 may further include the analysis component 224, configured to receive information/data from the three-dimensional mapping component 218, the gaze angle determination component 220, and the like, so as to analyze the information/data received to determine a level of impairment corresponding to the test subject 106. In some embodiments, the analysis component 224 is configured to analyze the quantified data received from the gaze angle determination component 222 to detect any evidence of horizontal nystagmus and/or angle of onset of nystagmus to determine impairment. In the optional usage of the server 300 in FIGS. 1 and 3, the output of the analysis component 224 may be communicated to the mobile device 200. That is, the administrator of the test, via the mobile device 200, may view the results of the analysis component 224. In such an embodiment, the analysis component 224 outputs a level of impairment that is transmitted to the mobile device 200 via the communications link 114, whereupon the user interface component 222, generates a visual representation thereof on the associated display 208.

The various components of the server computer system 300 may all be connected by a data/control bus 330. The processor 324 of the server computer system 300 is in communication with an associated database 344 via a link 338. A suitable communications link 338 may include, for example, the public switched telephone network, a proprietary communications network, infrared, optical, or other suitable wired or wireless data communications. The database 344 is capable of implementation on components of the server computer system 300, e.g., stored in local memory 326, i.e., on hard drives, virtual drives, or the like, or on remote memory accessible to the server computer system 300.

The associated database 344 corresponds to any organized collections of data (e.g., account information, images, videos, item information, user information, user device information, transaction information, etc.) used for one or more purposes. Implementation of the associated database 344 is capable of occurring on any mass storage device(s), for example, magnetic storage drives, a hard disk drive, optical storage devices, flash memory devices, or a suitable combination thereof. The associated database 344 may be implemented as a component of the server computer system 300, e.g., resident in memory 326, or the like. In one embodiment, the associated database 344 may include data corresponding to user information 348, i.e., administrator (LEO information), test subject information, or the like.

The server computer system 300 may include one or more input/output (I/O) interface devices 332 and 334 for communicating with external devices. The I/O interface 334 may communicate, via communications link 136, with one or more of a display device 340, for displaying information, such estimated destinations, and a user input device 342, such as a keyboard or touch or writable screen, for inputting text, and/or a cursor control device, such as mouse, trackball, or the like, for communicating user input information and command selections to the processor 324. The I/O interface 332 may communicate, via communications link 114, with the mobile device 200 via a computer network, e.g., the Internet, a cellular data connection, a proprietary network connection, or the like.

It will be appreciated that the method and system for determining impairment 100 is capable of implementation using a distributed computing environment, such as a computer network, which is representative of any distributed communications system capable of enabling the exchange of data between two or more electronic devices. It will be further appreciated that such a computer network includes, for example and without limitation, a virtual local area network, a wide area network, a personal area network, a local area network, the Internet, an intranet, or any suitable combination thereof. Accordingly, such a computer network comprises physical layers and transport layers, as illustrated by various conventional data transport mechanisms, such as, for example and without limitation, Token-Ring, Ethernet, or other wireless or wire-based data communication mechanisms. Furthermore, while depicted in FIGS. 1 and 3 as a networked set of components, the system and method are capable of implementation on a stand-alone device adapted to perform the methods described herein.

The server computer system 300 may include one or more of a computer server, workstation, personal computer, cellular telephone, tablet computer, pager, combination thereof, or other computing device capable of executing instructions for performing the exemplary method.

According to one example embodiment, the server computer system 300 includes hardware, software, and/or any suitable combination thereof, configured to interact with an associated user, a networked device, networked storage, remote devices, or the like.

The memory 326 may represent any type of non-transitory computer readable medium such as random access memory (RAM), read only memory (ROM), magnetic disk or tape, optical disk, flash memory, or holographic memory. In one embodiment, the memory 326 comprises a combination of random access memory and read only memory. In some embodiments, the processor 324 and memory 326 may be combined in a single chip. The network interface(s) 332, 334 allow the computer to communicate with other devices via a computer network, and may comprise a modulator/demodulator (MODEM). Memory 326 may store data processed in the method as well as the instructions for performing the exemplary method.

The digital processor 324 can be variously embodied, such as by a single core processor, a dual core processor (or more generally by a multiple core processor), a digital processor and cooperating math coprocessor, a digital controller, or the like. The digital processor 324, in addition to controlling the operation of the server computer system 300, executes instructions 328 stored in memory 326 for performing the method set forth hereinafter. It will be appreciated that the use of a server 300 as indicated above is an optional example implementation contemplated herein, and the mobile device 200, as indicated above, is capable of standalone operations. That is, the user (law enforcement officer, drug enforcement officer, official, agent, administrator, or the like) may utilize solely the mobile device 200 to perform the impairment determination testing described herein.

Figure 6:
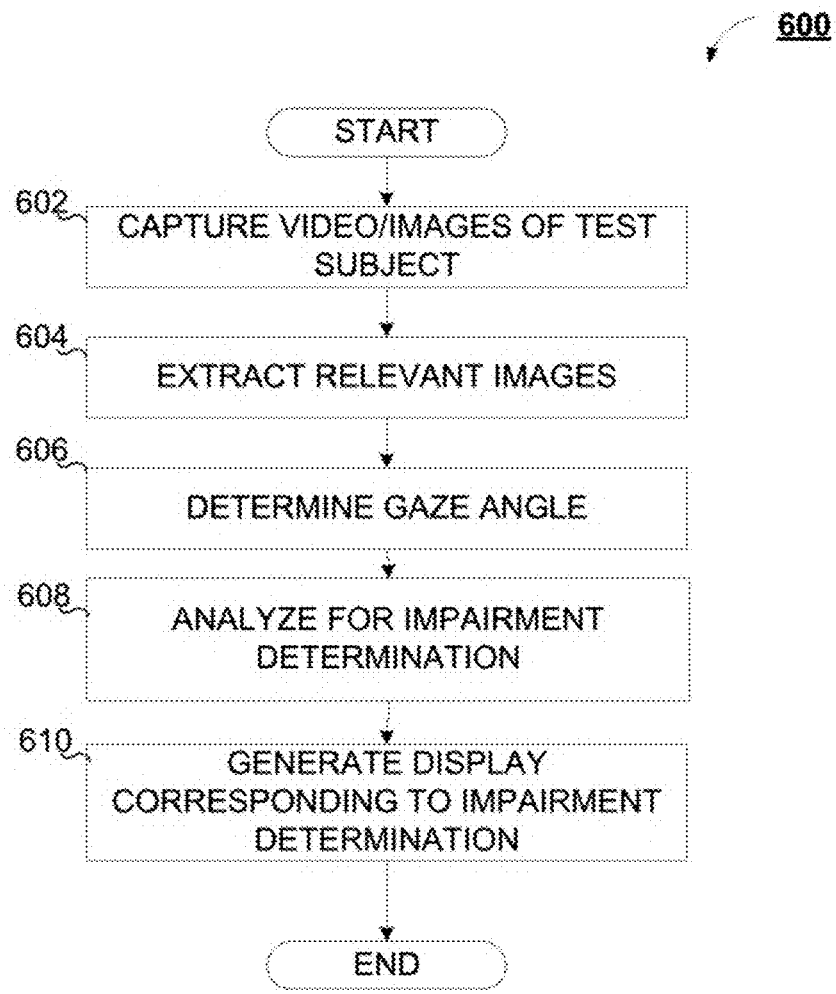
FIG. 6 is a method for performing a two-dimensional impairment analysis in accordance with one embodiment.

Turning now to FIG. 6, there is shown a method for determining a level of impairment of a test subject in accordance with some embodiments disclosed herein. As shown in FIG. 6, the method 600 begins at 602, whereupon the mobile device 200, via the image capture component 214, captures (e.g., records) a plurality of sequential images (e.g. video) of a test subject 106 as the test subject 106 is directed to shift gaze from the first reference point 102A to a second reference point 102B and/or vice versa, while holding the head still. That is, the test subject 106 is directed to look from left to right and back with the mobile device 200 positioned on the centerline 108 and recording or capturing the test subject 106 performing the alternating viewing. In variant embodiments, the position of the mobile device 200 may be off the centerline 108—for example, if the subject's gaze is moving toward the first reference point 102A then it may be beneficial for the camera to be located between the centerline 108 and the side 112B of the equilateral triangle 104 (see FIG. 1), as the angle of onset of nystagmus is likely to be in that area.

At 604, the three-dimensional mapping component 218 or other suitable component associated with the mobile device 200 extracts relevant image data from the sequential images, the extracting including cropping images from the captured sequence to output a sequence of relevant cropped head images. In some embodiments, the cropped head images correspond to the head of the test subject and are labeled with a fitted 3D head pose, e.g. indicating an orientation of the medial plane of the head, and the cropped head images including the eyes of the test subject. This sequence or set of cropped head images are then communicated to the gaze angle determination component 220.

The gaze angle determination component 220 then receives the output from the three-dimensional mapping component 218 (e.g., sequence of cropped head images from video, cropped video frames, etc.), and determines a gaze angle at 606 respective to the medial plane corresponding to the test subject 106. That is, the gaze angle determination component 220 analyzes the cropped output of sequential images from the three-dimensional component 218 for evidence of horizontal nystagmus and angle of onset of nystagmus.

At 608, the analysis component 224 receives information/data from the three-dimensional mapping component 218, the gaze angle determination component 220, and the like, so as to analyze the information/data received to determine a level of impairment corresponding to the test subject 106. The determined impairment is then output to the user interface component 222, which generates, at 610, a display corresponding to the determined impairment. In some embodiments, the display may be a visual representation of the output of the analysis component 224, e.g., graph, impairment number, impairment level, confidence in determination, probability of impairment, or the like.

EXPERIMENTAL DATA

Experiment 1—Dual Eye Analysis

Figure 5:
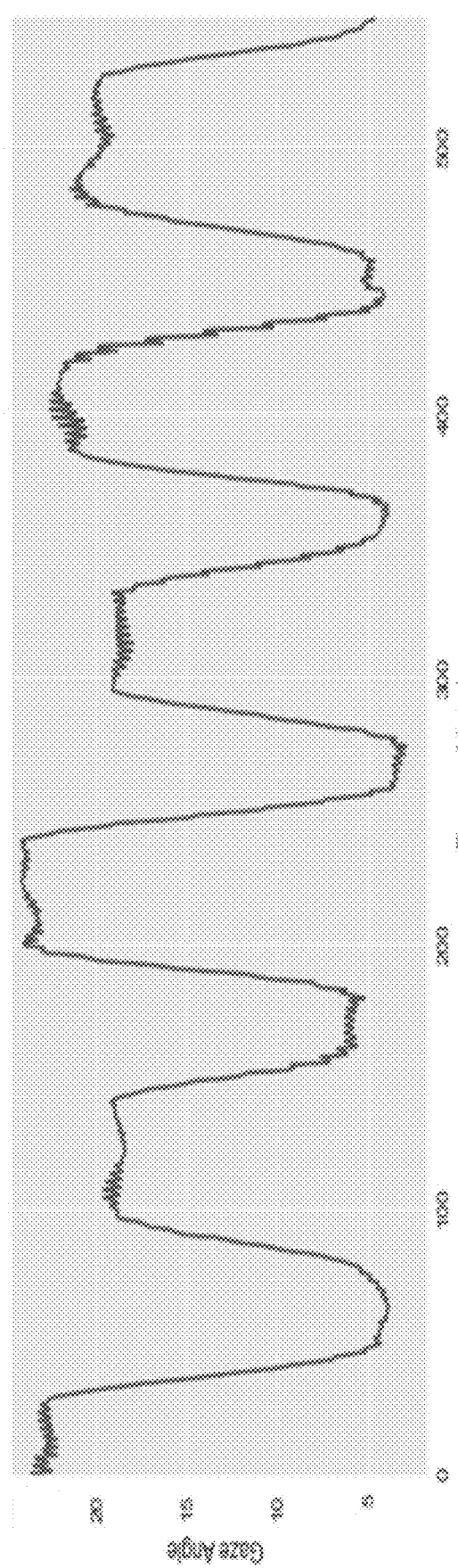
FIG. 5 is a graphical illustration of an eye gaze angle determined from video of the exemplary mobile device of FIG. 2.

The experiment was setup and run using a SAMSUNG Galaxy S9+ smartphone (e.g., a mobile device 200) placed on a tripod 110. The subject 106 looked at the left target (reference point A 102A), directly at the camera 214 of the mobile device 200, and at the right target (reference point B 102B). This procedure was repeated three (3) times. The gaze angle is plotted in FIG. 5 in absolute degrees from the angle of the camera. Ideally, each cycle in the gaze angle would reach 30°. However, there seems to be some small alignment issues (the troughs should be) 0° and the model seems to be underestimating the gaze angle. Regardless, the average angular error was estimated to be 9°, and given a reasonable experimental error of 2° to 5°, we would expect the model to have approximately 4° to 7° of average error (depending on the measurement error). The model produces relatively stable angle estimation, with a standard deviation of only 1.2°.

Experiment 2—Single Eye Analysis

Figure 7:
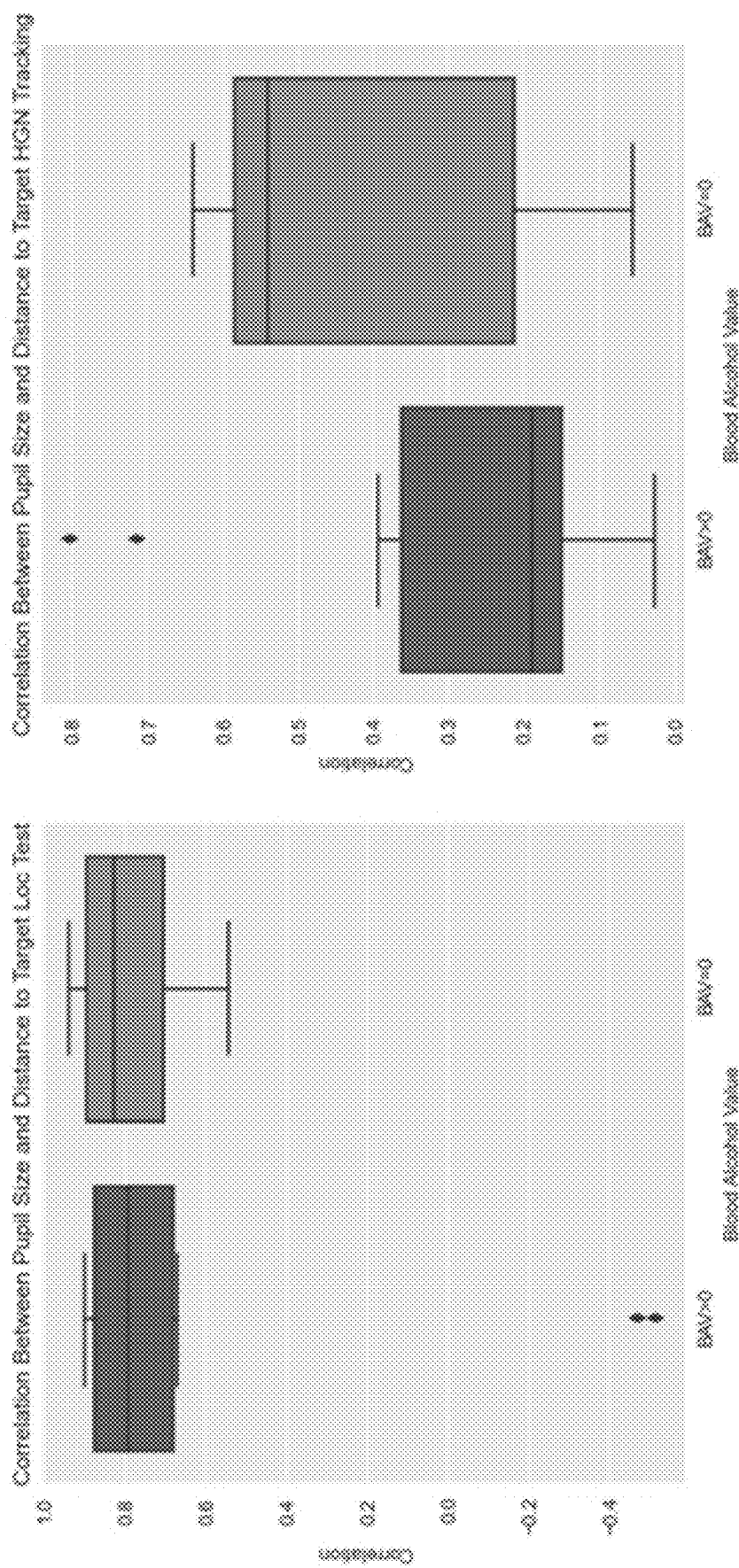
FIG. 7 is graphical correlation plot between pupil size and distance to gaze target utilized in accordance with varying embodiments.

The major confounding factor for such a system is distinguishing between vergence (simultaneous movement of both eyes in opposite directions to track a moving object) and convergence (simultaneous movement of both eyes toward each other to look at an object close to the subject). A known phenomenon of convergence is contraction of pupil diameter. Using data collected using a VR headset (as set forth in U.S. patent application Ser. No. 17/351,532-METRICS FOR IMPAIRMENT DETECTING DEVICE and in Gibbons et al., U.S. Pub. No. 2020/0121235 A1 and Bresler et al., U.S. Pub. No. 2020/0121195 A1, the entire disclosures of which are hereby incorporated by reference herein) under two experiments. The first test called lack of convergence (LOC), has the subject track a moving object that starts far away and move very close to the subject. In the second test, the object tracks left and right but remains relatively far away from the subject known as the horizontal nystagmus test (HGN). Each test was run for when the subject was sober and after the subject had consumed alcohol. The correlation between pupil size and distance to the target was calculated and summarized in FIG. 7. In the LOC test when they eyes converge on a close target, there is a high correlation between pupil size and gaze target distance. However, in the HGN test, when vergence occurs, there is not a strong correlation between pupil diameter and gaze target (the gaze target does move closer and further from the target but not enough to cause convergence to happen). In addition to the correlation, a logistic regression model was trained to detect convergence on the LOC data. For each LOC test, the same pattern for the gaze target was repeated twice. Using the first past as training data and the second pass as testing data, the model was able to detect convergence 92% of the time.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

A machine-readable medium includes any mechanism for storing or transmitting information in a form readable by a machine (e.g., a computer). For instance, a machine-readable medium includes read only memory ("ROM"); random access memory ("RAM"); magnetic disk storage media; optical storage media; flash memory devices; and electrical, optical, acoustical or other form of propagated signals (e.g., carrier waves, infrared signals, digital signals, etc.), just to mention a few examples.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

To aid the Patent Office and any readers of this application and any resulting patent in interpreting the claims appended hereto, applicants do not intend any of the appended claims or claim elements to invoke 35 U.S.C. 112 (f) unless the words "means for" or "step for" are explicitly used in the particular claim.

The invention claimed is:

1. A system configured to determine impairment due to drugs or alcohol, the system comprising:
   an image capture component configured to capture a plurality of sequential images of at least a head of a test subject; and
   a processor in communication with a memory storing instructions which are executed by the processor to:
      extract cropped head images of the head of the test subject from the captured sequential images,
      determining a three-dimensional (3D) head pose of the head in each cropped head image, wherein the determined 3D head pose in each cropped head image comprises a 3D orientation of a medial plane of the head in the cropped head image;
      for each cropped head image, determine a gaze angle of the test subject from the cropped head image;
      analyze the determined gaze angles to determine at least one of horizontal nystagmus and angle of onset of nystagmus;
      estimate a level of impairment of the test subject from the determined at least one of horizontal nystagmus and angle of onset of nystagmus; and
      generate a visual representation of the level of impairment of the test subject on an associated display;
   wherein the system comprises a mobile device and the image capture component is a built-in camera of the mobile device.

2. The system of claim 1 wherein, for each cropped head image, the gaze angle is determined with respect to the medial plane of the head in the cropped head image.

3. The system of claim 1 wherein, for each cropped head image, the gaze angle is determined with respect to the 3D head pose of the head in the cropped head image.

4. The system of claim 1 wherein the level of impairment is estimated based on one or more of amplitude, frequency, and/or the angle of onset of nystagmus.

5. The system of claim 1 wherein the image capture component is not at a fixed reference position with respect to the head of the test subject.

6. A method of indicating impairment due to drugs or alcohol, the method comprising:
   capturing, via an image capture component of a mobile device, a plurality of sequential images of a test subject;
   extracting at least one cropped head image from the captured sequence including determining a head pose of the cropped head image, wherein determining the head pose of the cropped head image further comprises determining a three-dimensional (3D) head pose of the head in each cropped head image, wherein the determined 3D head pose in each cropped head image comprises a 3D orientation of a medial plane of the head in the cropped head image;
   determining a gaze angle of the test subject in the at least one cropped head image;
   analyzing the determined gaze angle to determine at least one of a horizontal nystagmus and angle of onset of nystagmus;
   estimating a level of impairment of the test subject from the determined at least one of horizontal nystagmus and angle of onset of nystagmus; and
   generating a visual representation of the level of impairment of the test subject on an associated display,
   wherein at least one of the capturing, extracting, determining, analyzing, and generating is performed by a processor in communication with memory storing instructions thereon which are executed by the processor.

7. The method of claim 6, wherein for each cropped head image, the gaze angle is determined with respect to the medial plane of the head in the cropped head image.

8. The method of claim 6, wherein for each cropped head image, the gaze angle is determined with respect to the 3D head pose of the head in the cropped head image.

9. The method of claim 6, wherein the level of impairment is estimated based on one or more of amplitude, frequency, and/or the angle of onset of nystagmus.

10. The method of claim 6, wherein the image capture component is not at a fixed reference position with respect to the head of the test subject.

11. A mobile device configured to determine impairment due to drugs or alcohol, the mobile device comprising:
    an image capture component configured to capture a plurality of sequential images of at least a head of a test subject;
    a three-dimensional mapping component configured to generate a cropped, three-dimensional image of the head of the test subject from the plurality of sequential images captured by the image capture component, wherein the three-dimensional mapping component is configured to determine a three-dimensional (3D) head pose of the head in each cropped head image, wherein the determined 3D head pose in each cropped head image comprises a 3D orientation of a medial plane of the head in the cropped head image, and wherein, for each cropped head image, the gaze angle is determined with respect to the medial plane of the head in the cropped head image;

a gaze angle determination component configured to receive the cropped, three-dimensional image of the head of the test subject and determine a gaze angle therefrom using a recurrent neural network;

an analysis component configured to analyze the determined gaze angle to detect at least one of horizontal nystagmus or angle of onset to determine impairment; and a display configured to generate a visual representation of the determined impairment.

12. The mobile device of claim 11, wherein, for each cropped head image, the gaze angle is determined with respect to the 3D head pose of the head in the cropped head image.

13. The mobile device of claim 11 wherein a level of impairment is estimated based on one or more of amplitude, frequency, and/or the angle of onset of nystagmus.

* * * * *